United States Patent Office 3,791,955
Patented Feb. 12, 1974

3,791,955
PREPARATION OF CHALCOGENIDE GLASS
SPUTTERING TARGETS
Richard M. Klein, Framingham, Mass., assignor to GTE
Laboratories Incorporated, Waltham, Mass.
Filed Dec. 11, 1972, Ser. No. 313,740
Int. Cl. C23c 15/00
U.S. Cl. 204—298                                    3 Claims

ABSTRACT OF THE DISCLOSURE

A method of preparing large area chalcogenide glass sputtering targets. These targets are prepared in an evacuated chamber or inert gas atmosphere by heating a boule of chalcogenide in a quartz dish to contour the bottom face of the target. While heating the boule, a weight forces a wire mesh with a stud attached into the top surface of the boule. After a predetermined time to insure good physical bond between glass and mesh, the chamber is cooled to ambient and the sputtering target (chalcogenide glass-mesh-stud) may be removed.

BACKGROUND OF THE INVENTION

The present invention relates to the field of sputtering targets and, more particularly, to large area chalcogenide glass targets with improved physical properties and methods for making same.

Chalcogenide glasses, including those materials commonly called amorphorus semiconductors, are being widely investigated for their useful optical and electrical properties. Many of the potential applications of these materials, including optical and electrical switches, require that the glass be in the form of a thin film. Since it has been found that evaporation techniques are generally not suitable for chalcogenide glasses due to selective evaporation of some of the atomic constituents of the glass, sputtering has gained wide favor as the thin film deposition technique. It is known, however, that in order to obtain uniform thin films over a given area, the area of the sputtering target used to produce this film must be several times larger.

These are two general techniques for preparing chalcogenide glass sputtering targets: fused targets, which are formed by melting the glass in a suitably shaped quartz container; and hot-pressed targets, formed by powdering some fired glass and then hot-pressing the powder into a suitable shape.

One of the disadvantages of fused targets is that a large amount of glass is required to produce a target of suitable mechanical strength. The strength of the target is important not only during handling but also during sputtering since these glasses generally soften at low temperatures and are prone to thermal shock. In addition, a fused target is difficult to fasten to the sputtering system cathode. Finally, firing the glass so as to provide a large area target generally leads to poor glass homogeneity.

Hot-pressed targets, on the other hand, require additional procedures, i.e., grinding and hot-pressing, which could affect the purity and chemical composition of the glass. For example, hot-pressing could alter the composition by means of selective volatilization of the constituent elements. A final disadvantage is that selective sputtering, i.e., the removal of some constituents of the glass at a faster rate than others, is found to be more prevalent with hot-pressed as opposed to fused targets. This leads to inhomogeneous films.

For both types of target mentioned above, the heat generated during sputtering can easily soften the target and destroy it due to the low softening point of most chalcogenide glass. It is therefore the purpose of this invention to provide a method of producing chalcogenide glass sputtering targets of large area with improved physical properties.

SUMMARY OF THE INVENTION

In accordance with the features of the present invention, a sputtering target constructed of chalcogenide glass, wire mesh, and cathode connector is prepared by heating the components in a controlled atmosphere to soften the glass while forcing the wire mesh with a cathode connector attached into the softened glass. The target may be prepared according to the present invention by placing a boule of calcogenide glass in a quartz mould to contour the bottom face of the target. A piece of metal mesh approximately the same area desired for the target, with a cathode connector or stud attached, is placed on top of the glass. An inert metal weight is placed over the stud; this weight serves to protect the threads of the studs as well as assure the penetration of the mesh into the molten chalcogenide glass. The entire assembly is then placed in a quartz ampoule which is evacuated and flame sealed. The ampoule is then heated above the softening point of the chalcogenide glass and held at that temperature for sufficient time to insure good physical bond between the glass and mesh. After cooling slowly to room temperature, the ampoule is opened and the sputtering target (chalcogenide glass-mesh-stud) can be easily removed from the rest of the apparatus.

In general, this process provides the advantages of a fused target with regard to uniform sputtering while maintaining the flexibility of the hot-pressed target technique in obtaining large area targets. In particular, the advantages are: a large area, mechanically strong target can be fabricated using a minimum amount of chalcogenide glass; the surface of the target is fused; volatilization lossess from the glass are minimized by preparing the target in a closed system; the target can easily be mated to the sputtering system; during sputtering, the metal mesh assists in conducting heat from the chalcogenide glass, thus limiting its temperature; and even if the glass does soften during sputtering, it would tend to remain in position due to surface tension so that the deposition would not have to be interrupted.

Further features and advantages of the invention will become more readily apparent from the following detailed description of a specific embodiment of the invention when taken in conjunction with the accompanying drawings. In the several figures, like reference numerals identify like elements.

DESCRIPTION OF THE PREFERRED EMBODIMENT

Figure 1:
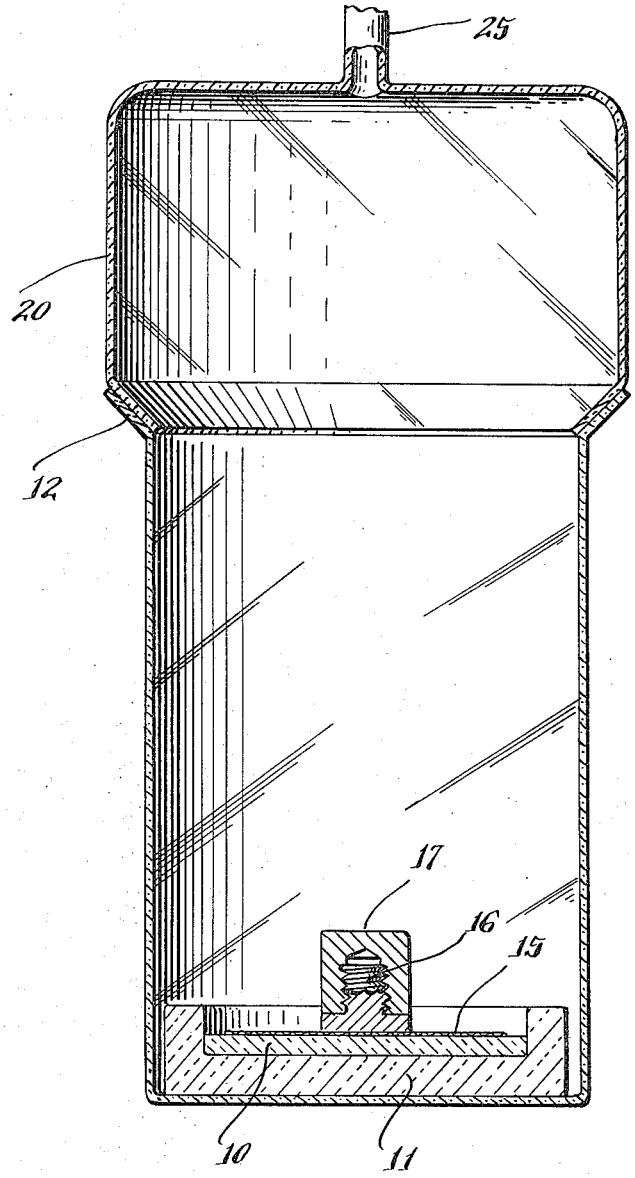
FIG. 1 is a schematic view of an apparatus for making sputtering targets in accordance with the present invention.

Attention is directed to FIG. 1, wherein the apparatus for producing a sputtering target in accordance with the present invention is illustrated. A quantity of bulk glass or boule 10 is placed on a mould or dish 12. The glass may be of any type of chalcogenide useful in sputtering, by way of example, one may use 24 atomic percent arsenic (As), 16 atomic percent antimony (Sb), and 60 atomic percent selenium (Se). Any glass shape could be used depending on the desired diameter and thickness of the finished target. Bulk glass is preferred to powder or smaller chunks due to the reduced chance of bubble entrapment in the former. The boule may be prepared using standard techniques and may be sliced into approximately 50 mil thick slices. Thinner slices could be used depending on the amount of glass available and the desired finished target area as previously mentioned.

The mould or dish may be constructed of any material, preferably having a much lower coefficient of thermal expansion than the chalcogenide glass, such as quartz. The lower coefficient of thermal expansion allows the finished sputtering target to separate readily from the mould.

On top of the boule 10 is placed a reticulated member or mesh 15 which has approximately the same area as the desired target. The mesh may be constructed of any inert material which can withstand the temperatures used in target preparation. Preferably, a refractory material such as molybdenum may be used to reduce the chance of metallic diffusion into the glass because a good physical rather than a chemical bond is desirable. A cathode connector or stud 16 is fixedly attached to mesh 15. The stud may be attached by spot welding and be threaded to mate easily to a cathode of a sputtering device.

An inert weight 17 is removably mounted on top of the stud 16. If the stud is threaded the weight may be screwed into place thereby serving a dual purpose: (1) To provide sufficient downward force during the target preparation to assure the mesh penetration of the molten glass; and (2) To protect the threads on the stud. Therefore, the mass of the weight 17 depends on the viscosity of the glass to insure proper penetration of mesh 15 into the glass 10.

The entire assembly during preparation of the target is enclosed in a container or ampoule 20 to control the atmosphere surrounding the assembly either by introducing inert gas into the container or evacuating the container. In either case, the ampoule is sealed by flame or bakeable vacuum seal 21 around the perimeter of container 10. The container is then evacuated by a conventional technique such as by diffusion pump (not shown). The container may then be sealed either under vacuum or with backfill of inert gas. The sealing is accomplished by flame working the exhaust turbulation 25. A vacuum furnace may be used in lieu of ampoule 20.

The sealed ampoule 20 is heated in a furnace (not shown) to a temperature above the softening point of the chalcogenide glass and left at that temperature for sufficient time to insure a good physical bond between the glass 10 and the mesh 15. The temperature should be chosen for the particular glass and weight used so that there is some, but not excessive, penetration of the mesh into the glass. For the 24/16/60 As-Sb-Se glass system previously mentioned with a weight of 9.6 grams a firing temperature of 400° C. was used. Preferably, heating should be controlled so that there is a temperature gradient vertically down the ampoule such that the highest temperatures are at the top of the ampoule; in this way volatization losses from the glass are minimized.

After heating, the ampoule is cooled slowly to ambient conditions, the rate of cooling should be controlled to reduce strain and avoid failure by thermal shock. After cooling, the ampoule is opened and the target (chalcogenide glass-mesh-stud) illustrated in FIG. 2, can be easily removed from the rest of the assembly.

Figure 2:
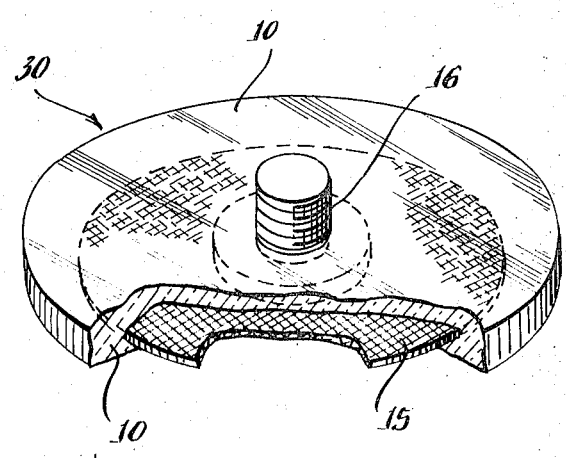
FIG. 2 is a perspective view with parts broken away of a sputtering target prepared by the apparatus shown in FIG. 1.

Attention is now directed to FIG. 2 wherein is illustrated a sputtering target prepared by the method described hereinbefore. The sputtering target is generally numerically designated 30. The target 30 comprises a stud 16, mesh 15 and glass 10. The stud 16 is threaded for mating to the sputtering system cathode and is spot welded to mesh 15 which is embedded in the chalcogenide glass 10.

The target may then be mated and used in a sputtering system cathode. By way of example, in operation of a typical sputtering system, when an inert gas, and, possibly a specific reactive gas, is introduced in the system, an RF discharge can be initiated between the electrodes. (An RF rather than DC discharge is used since the target is non-metallic.) Bombardment of the target by gas ions accelerated by the high voltage causes particles of atomic dimensions to be ejected from the target. Generally, a dark space shield is placed around the target to confine the plasma so that ejected particles are directed toward the anode which comprises the substrate for the film being deposited.

Due to the nature of the sputtering process, some of the ion impact energy dissipated at the target is converted into heat. This heating is particularly damaging in chalcogenide glasses due to their high thermal expansion coefficients and low softening points. Targets produced by the aforementioned process are less susceptible to these problems. Firstly, targets can be made thinner to reduce thermal shock failure because of the added mechanical stability provided by the metal mesh. Secondly, the metal mesh assist in conducting heat from the chalcogenide glass, thus limiting its temperature during sputtering. Finally, even if the glass softens slightly during sputtering, the metal mesh will tend to hold the glass in shape.

Another consequence of the sputtering process is that due to the directionality of the ejected particles, deposition will only be uniform on the central portion of the substrate. This limited uniform area, approximately one-fourth the area of the target, necessitates the use of large targets in order to obtain uniformly thick films over a substantial substrate area. Therefore, another advantage of the aforementioned process is that it facilitates the production of large targets.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A sputtering target made in accordance with the features of the present invention which comprises:
    (a) an inert reticulated flat plate;
    (b) a chalcogenide glass covering said plate; and
    (c) a stud fixedly mounted on said plate and extending beyond said glass covering, for connecting to an external electronic circuit.

2. A target in accordance with claim 1 wherein said plate is a molybdenum wire mesh.

3. A target in accordance with claim 1 wherein said chalcogenide glass comprises 24 atomic percent arsenic, 16 atomic percent antimony and 60 atomic percent selenium.

References Cited

UNITED STATES PATENTS

| | | | |
|---|---|---|---|
| 3,620,957 | 11/1971 | Emery et al. | 204—298 |
| 3,649,512 | 3/1972 | Ackley | 204—298 |
| 3,725,238 | 4/1973 | Fischbein et al. | 204—298 |

JOHN H. MACK, Primary Examiner

D. R. VALENTINE, Assistant Examiner